United States Patent
Annamraju et al.

(10) Patent No.: US 9,681,146 B2
(45) Date of Patent: Jun. 13, 2017

(54) DECODING FRAMES

(71) Applicant: Imagination Technologies Limited, Kings Langley (GB)

(72) Inventors: Venu Annamraju, Hyderabad (IN); Harish Rajamani, Hyderabad (IN); Ranjith Irukulapati, Hyderabad (IN)

(73) Assignee: Imagination Technologies Limited, Kings Langley (GB)

( * ) Notice: Subject to any disclaimer, the term of this patent is extended or adjusted under 35 U.S.C. 154(b) by 187 days.

(21) Appl. No.: 14/568,590

(22) Filed: Dec. 12, 2014

(65) Prior Publication Data
US 2015/0172689 A1 Jun. 18, 2015

(30) Foreign Application Priority Data
Dec. 16, 2013 (GB) .................................. 1322194.0

(51) Int. Cl.
| H04N 7/12 | (2006.01) |
| H04N 11/02 | (2006.01) |
| H04N 11/04 | (2006.01) |
| H04N 19/44 | (2014.01) |
| H04N 19/65 | (2014.01) |
| H04N 19/50 | (2014.01) |

(52) U.S. Cl.
CPC ............. *H04N 19/44* (2014.11); *H04N 19/50* (2014.11); *H04N 19/65* (2014.11)

(58) Field of Classification Search
None
See application file for complete search history.

(56) References Cited

U.S. PATENT DOCUMENTS

| 6,721,327 | B1 * | 4/2004 | Ekudden | ............. H04L 12/6418 370/395.61 |
| 9,369,724 | B2 * | 6/2016 | Callahan | ............. H04N 19/174 |
| 2010/0226444 | A1 | 9/2010 | Thevathasan et al. | |
| 2012/0008681 | A1 * | 1/2012 | Lundin | ................ H04N 19/895 375/240.12 |
| 2013/0229575 | A1 * | 9/2013 | Lin | .......................... H04N 5/50 348/515 |
| 2015/0043885 | A1 * | 2/2015 | Yamakage | ......... H04N 21/4305 386/207 |

FOREIGN PATENT DOCUMENTS

| EP | 2405661 A1 | 1/2012 |
| WO | WO-2009/047697 A2 | 4/2009 |

* cited by examiner

*Primary Examiner* — Frederick Bailey
*Assistant Examiner* — Talha M Nawaz
(74) *Attorney, Agent, or Firm* — Vorys, Sater, Seymour and Pease LLP; Vincent M DeLuca

(57) ABSTRACT

A system for decoding a data stream, comprising: a first decoder configured to decode the data stream at a first rate so as to generate a first stream of frames for playback and arranged to continue generating the first stream despite encountering an error in a particular frame; a second decoder operable to decode the data stream at a second rate so as to generate a second stream of frames; and a controller configured to: detect the error and cause the second decoder to decode the data stream from the particular frame in dependence on error correction data, the second rate being faster than the first rate such that the second stream catches up with the first stream; determine when the second decoder catches up with the first decoder; and cause the second decoder to operate at the first rate so as to generate the second stream for playback.

14 Claims, 5 Drawing Sheets

DECODING FRAMES

BACKGROUND OF THE INVENTION

This invention relates to a data processing system arranged to perform a resynchronisation mechanism for a decoder.

Real-time streaming of multimedia content over the internet has become an increasingly common application in recent years. A wide range of multimedia applications, such as on-demand TV, live TV viewing, video conferencing, net meetings, video telephony and many others rely on end-to-end streaming solutions. Unlike a "downloaded" video file, which may be retrieved first in "non-real" time and viewed or played back later, streaming video applications require a video source to encode and to transmit a video signal over a network to a video receiver, which must decode and display the video signal in real time. The receiving device receives encoded video data packets from the network and transfers the packets to a video decoder for decoding.

Compression techniques for transmitting video data can use so-called reference frames. When compressing blocks of video data, the encoding process can generate intra frames (I-frames). An I-frame is a compressed version of a frame which can be decompressed using only the information in the I-frame itself, and without reference to other frames. They are sometimes referred to as key frames. Another type of frame can also be generated, which are sometimes referred to as inter or predictive frame (P-frames), which are generated by predictive inter frame coding based, directly or indirectly, on a reference frame. The reference frame can be the preceding frame, or it could be a different earlier or later frame in a sequence of frames.

During the process of I-frame and P-frame coding, information in the image is processed block-wise and a Discrete Cosine Transform (DCT) is applied to each block. The resulting DCT coefficients consist of coefficients corresponding to the strength of various frequencies in the block. The coefficients of each block are quantized with various levels, so as to achieve the desired trade-off of quality and bit-rate. The encoder then reconstructs the quantized frame by applying inverse quantization and inverse DCT in the exact same way as a decoder would, and uses it as a potential reference frame for subsequent frames. The replication of the decoder functionality helps keep an encoder and decoder synchronized.

Problems can arise when a streaming video signal is transmitted across networks, such as the Internet. For example, significant packet loss rate across the transmission network often requires re-transmission of the lost packets. Typically, a lost data packet needs to be recovered prior to the time the corresponding frame must be decoded. If the lost packet is not received, the current frame being processed as well as the subsequent frames can be adversely affected because of the predictive coding.

Loss of packets can cause a loss in the synchronisation of the states of the encoder and decoder. This can cause artifacts in the displayed frames due to corrupted reference frame(s) arising due to the missing packets of the encoded frames. Due to real-time play constraints in some applications such as video telephony, the decoder may have to decode an incomplete frame and thus it will lose state synchronization with the encoder. After the incomplete frame has been decoded, any packets belonging to the decoded frame that arrive subsequent to decoding of the frame, e.g. due to late arrival or FEC repair or retransmitted packets, cannot help regain decoder state synchronization.

Typically, re-synchronization of the decoder state can be achieved by requesting an Instantaneous Decoder Refresh (IDR), enabling a Reference Picture Selection (RPS) feature or waiting for a key frame.

An IDR can be requested by a receiver, which when received without loss and subsequently decoded, completely synchronizes the encoder-decoder state. However, frequent IDR requests can lead to bandwidth being exhausted leading to poor quality, frame freezes and violations of constant bitrate constraints for some applications such as video telephony.

The RPS feature allows a receiver, upon encountering an incomplete frame, to indicate to an encoder that one of its previously received correct frames is to be used as a new reference frame for the next frame in encoder pipeline. However, RPS suffers from issues when the round trip delay between the encoder and decoder is greater than the duration for which reference frames are stored in encoder. RPS also tends to reduce encoder efficiency due to prediction from older frames.

Key frames, which can be protected by forward error correction (FEC), ensure regular encoder-decoder synchronization, provided they do not have missing packets. Packet losses in non-key frames will temporarily cause loss of synchronization until the next key frame. However, key frames tend to reduce encoding efficiency due to prediction from older frames. Furthermore, the FEC feature is proprietary and is not supported in standards.

Other approaches used to solve the decoder state synchronization problem include halting decoding until frame completion. This mechanism for incomplete frame handling involves waiting for retransmitted/repair packets to arrive before continuing to decode the incomplete frame. However, this causes the displayed video to be paused and appear stuttered. Another approach would be to increase the buffering delay. This estimates the typical missing packet retransmission time and increases the buffering delay. However, this approach leads to loss in real-timeliness and interactivity, deeming it unsuitable for applications such as video telephony and video conferencing.

Furthermore, in Multipoint Control Unit (MCU) centric video conferencing, where multiple receivers can experience packet loss at different times, frequent IDR frames may be generated, leading to poor quality. Decoder synchronization by RPS selection also may not be feasible with a single encoder instance, unless multiple encoder instances, specific to each end-point are used. In MCU-less video conferencing, where one sender sends the same packets to multiple receivers, it may be sub-optimal to generate IDR frames for each receiver's packet loss. In live video User Datagram Protocol (UDP) streaming to multiple receivers, similar real-time constraints and issues also apply.

SUMMARY OF THE INVENTION

According to a first aspect of the present invention there is provided a data processing system for decoding a data stream, the data processing system comprising: a first decoder configured to decode the data stream into a sequence of media frames at a first decode rate so as to generate a first media stream for playback in real-time, the first decoder being arranged to continue generating the first media stream for playback despite encountering an error in decoding a particular frame of the sequence; a second decoder operable to decode the data stream into a sequence of media frames at a second decode rate so as to generate a second media stream; and a controller configured to detect the error and, responsive to that detection, cause the second decoder to decode the data stream from the particular frame in the sequence of media frames, the second decoder being arranged to decode from the particular frame in dependence on error correction data received over the data stream for the particular frame, wherein the second decode rate is faster than the first decode rate such that the sequence of frames of the second media stream catches up with the sequence of frames of the first media stream and the controller is further configured to: determine when the sequence of frames from the second decoder catches up with the sequence of frames from the first decoder; and responsive to that determination, cause the second decoder to operate at the first decode rate so as to generate the second media stream for playback in real-time.

The controller may be further configured to cause the first decoder to cease decoding the media data stream responsive to its determination as to when the sequence of frames from the second decoder catches up with the sequence of frames from the first decoder.

Preferably, the controller is configured to determine when the sequence of frames from the second decoder catches up with the sequence of frames from the first decoder by estimating from the first and second decode rates when the first and second decoders will decode the same frame. The second decode rate may be between two and four times greater than the first rate. Preferably, the second decode rate is about two times greater than the first rate.

The controller may be configured to determine when the sequence of frames from the second decoder catches up with the sequence of frames from the first decoder by determining a time difference between a time when the particular frame is decoded at the first decoder and a time when the particular frame is decoded at the second decoder, and dividing the time difference by a relative rate subtracted by 1, the relative rate being the second decode rate divided by the first decode rate.

Preferably, the controller is configured to determine the second decode rate from the processing resources available at the data processing system for the second decoder.

Preferably the controller is configured to, responsive to the error detection, initialise the second decoder using context data from the first decoder.

The context data may include one or more of the last complete frames one or more of the last complete frames of the first media stream, state information of the first decoder from the up to the point at which the last complete frame was decoded, the first frame as generated by the first decoder, and state information of the first decoder from the point at which the error was encountered.

The error encountered by the first decoder may be data missing from the data stream, or corrupted data of the data stream, or an encoder error.

Preferably, the first decoder is configured to decode said particular frame so as to generate a frame with artifacts for playback.

Preferably, the first decoder is configured to, on continuing to generate the first media stream for playback after encountering the error decoding the particular frame, decode frames subsequent to the particular frame so as to generate frames for playback which potentially include artifacts.

The data processing system may further comprise a communications port for receiving the data stream.

According to a second aspect of the invention there is provided machine readable code for generating the data processing system.

According to a third aspect of the invention there is provided a machine readable storage medium having encoded thereon non-transitory machine readable code for generating the data processing system.

According to a fourth aspect of the invention there is provided a method of decoding a data stream, the method comprising: at a first decoder, decoding the data stream into a sequence of media frames at a first decode rate so as to generate a first media stream for playback in real-time, and continuing to generate the first media stream for playback despite encountering an error in decoding a particular frame of the sequence; detecting the error and, responsive to that detection, causing a second decoder to decode the data stream from the particular frame in the sequence of media frames, at the second decoder, decoding the data stream into a sequence of media frames at a second decode rate so as to generate a second media stream, the second decoder decoding from the particular frame in dependence on error correction data received over the data stream for the particular frame, wherein the second decode rate is faster than the first decode rate such that the sequence of frames of the second media stream catches up with the sequence of frames of the first media stream; determining when the sequence of frames from the second decoder catches up with the sequence of frames from the first decoder; and responsive to that determination, causing the second decoder to operate at the first decode rate so as to generate the second media stream for playback in real-time.

According to a fifth aspect of the invention there is provided a computer readable code adapted to perform the steps of the method when the code is run on a computer.

According to a sixth aspect of the invention there is provided a computer readable storage medium having encoded thereon the computer readable code.

DESCRIPTION OF THE DRAWINGS

The present invention will now be described by way of example with reference to the accompanying drawings, in which.

DETAILED DESCRIPTION OF THE DRAWINGS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of the present invention provide an improved mechanism for resynchronising a decoder with an encoder. In the examples below, a mechanism for resynchronising a video decoder with a corresponding encoder is described. However, the mechanism can be applied to other types of media decoders that employ inter-frame predictive coding techniques that enable the playback of the media from a data stream.

Figure 1:
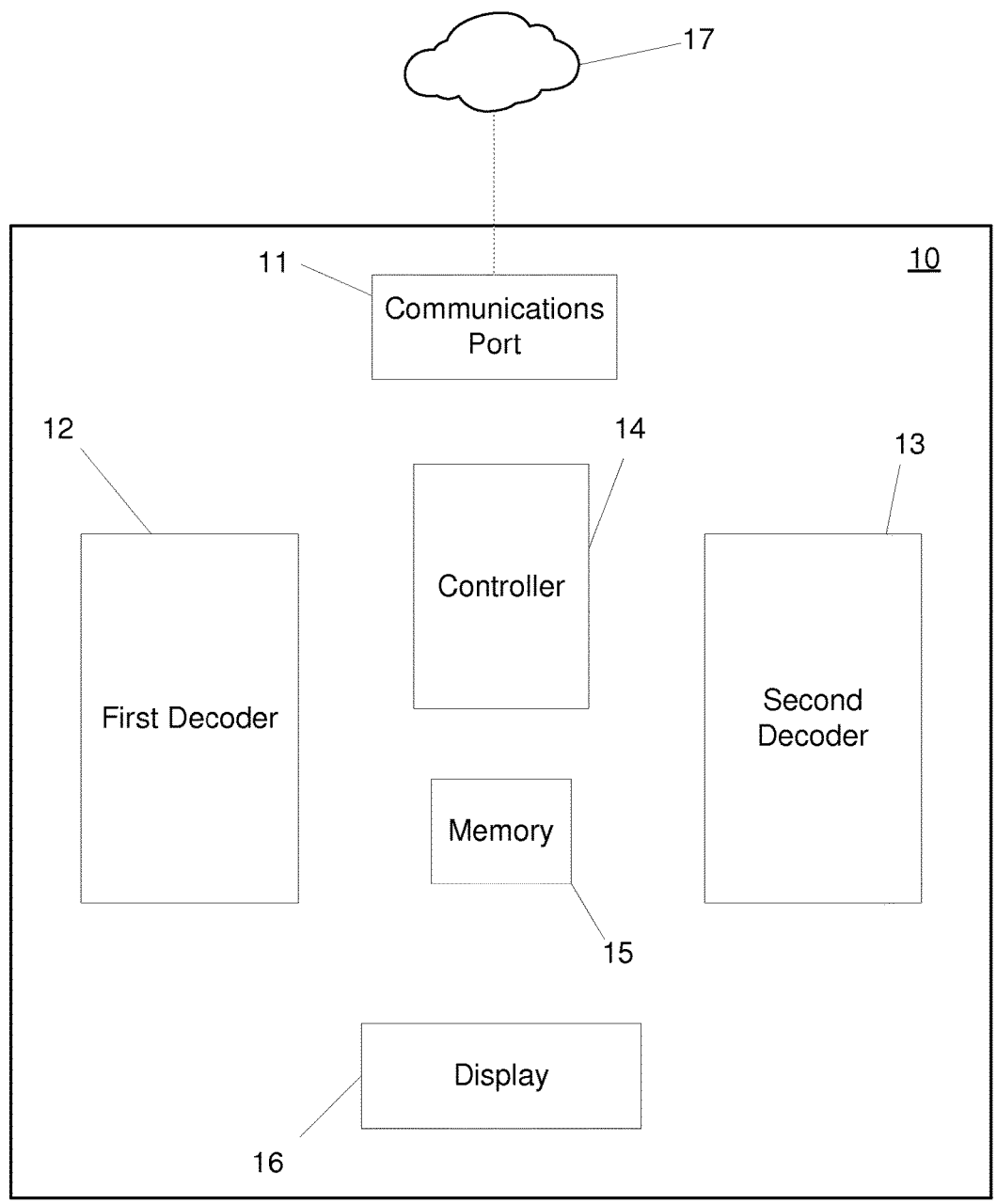
FIG. 1 is a schematic diagram of a device capable of receiving and decoding a sequence of video frames.

FIG. 1 depicts a receiving device 10, which may be any suitable device that is capable of consuming packet based data such as a computer, smartphone, videophone, etc. The receiving device 10 comprises a communications port 11 for connection to a communications network 17 such as the internet or other packet based networks. The receiving device 10 can transmit and/or receive data packets to and/from the communications network 17 via the communications port 11.

A transmitting device (not shown) can encode video data for transmitting over the communications network 17 to the receiving device 10. The video data may be encoded according to a video coding standard such as H.261, H.262 (MPEG-2 or ISO/IEC 13818-2), H.263 or H.264 (AVC or ISO/IEC 14496-10) standards or the MPEG-1 (ISO/IEC 11172-2), MPEG-4 Visual (ISO/IEC 14496-2) or SMPTE 421M standards. The encoded video data can take the form of a bit stream comprising a series of frames which are transmitted in the form of packets. The frames can include P-frames and I-frames. P-frames contain data representing the difference between the frame and one or more reference frames. I-frames are frames representing the difference between pixels within a frame, and as such can be decoded without reference to another frame.

Figure 2:
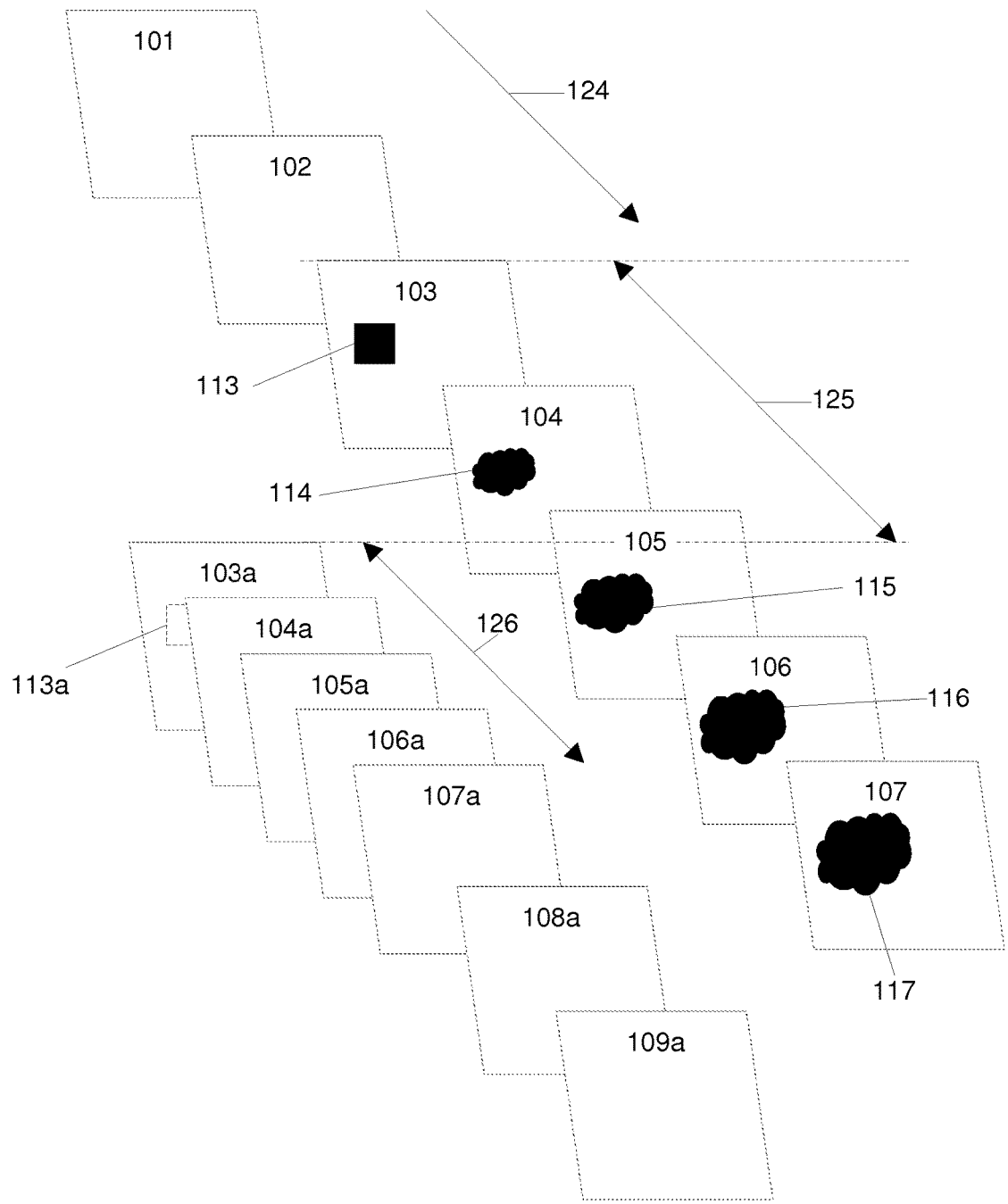
FIG. 2 illustrates an example of decoding a sequence of frames having one instance of error at the receiving device.

The receiving device 10 comprises a first decoder 12 which can decode the encoded video data received at the communications port 11. FIG. 2 illustrates the decoding of a sequence of frames received at the receiving device 10. The receiving device 10 receives a stream of one or more packets carrying data encoding frame 101, which may be a P- or I-frame. Frame 101 may be considered to be a "complete" or "lossless" frame if all (or more than a threshold level) of the packets required to decode the frame are received by the receiving device 10. The state of the first decoder 12 is thus said to be in synchronisation with the encoder because the frame has been successfully decoded by the first decoder 12 and is at least substantially the same as the frame encoded by the encoder. The first decoder 12 outputs decoded frame 101, which can then be displayed. The receiving device 10 may comprise a display or display input 16 for displaying the decoded frames.

Figure 3:
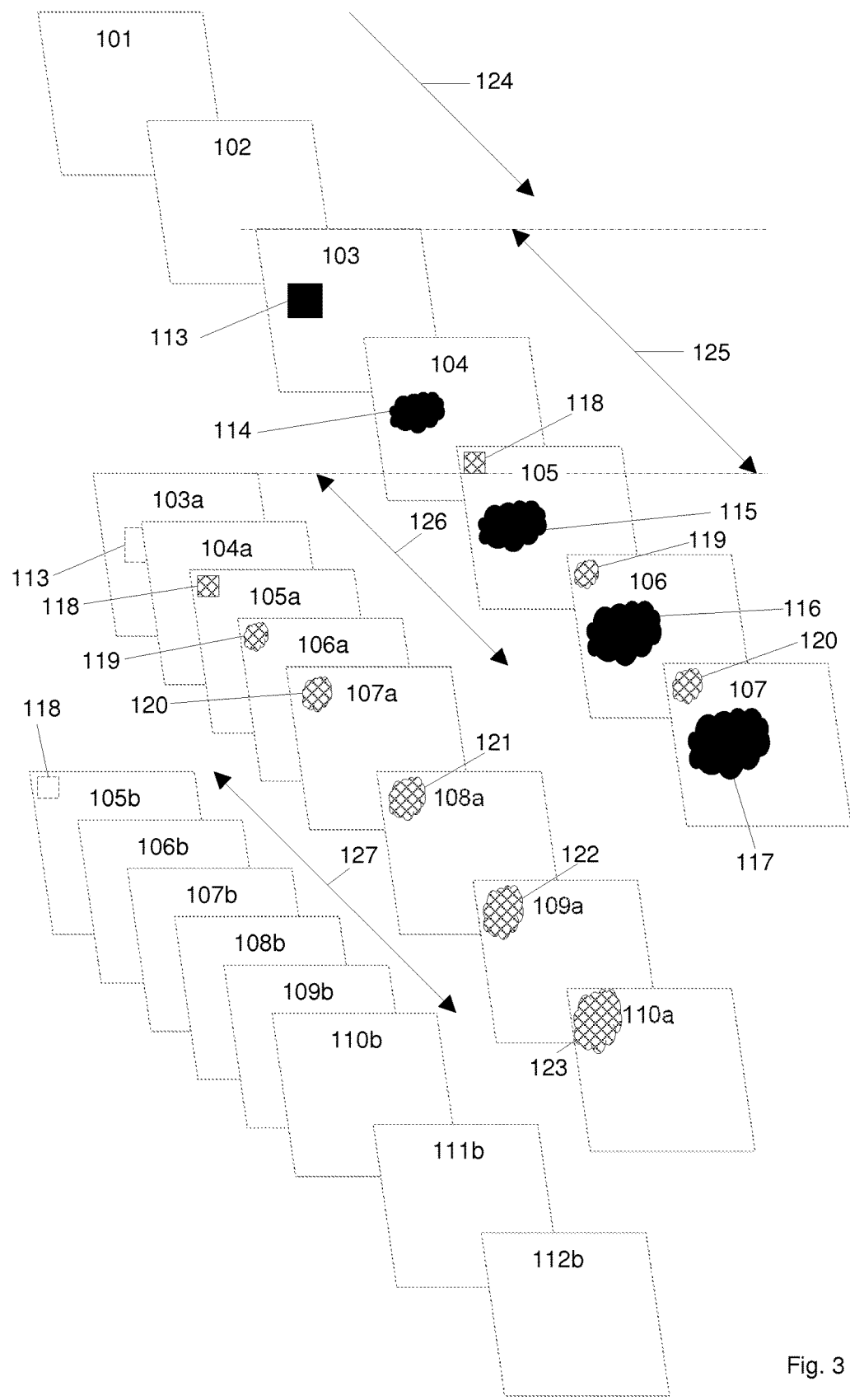
FIG. 3 illustrates another example of decoding a sequence of frames having two instances of error at the receiving device.

The first decoder 12 then decodes the next frame 102 in the sequence of frames. The first decoder 12 decodes the sequence of frames at a first rate, which may be the real-time rate at which the video frames are to be displayed (at least when the encoder reaches its steady state). The first rate may be predetermined or set by, for example, the encoder at the transmitting device. In FIGS. 2 and 3, arrow 124 indicates the direction of the flow of time and the spacing between the frames indicates the rate at which the frames are decoded. In the example shown in FIG. 2, frame 102 is successfully decoded and the frame is output for display.

If the decoder 12 does not receive all of the data defining a frame in time for when the decoder 12 is due to decode that frame—for example, because one or more data packets carrying the frame data go missing or become corrupted—then the decoded frame generated by the decoder 12 will be incomplete and include errors. Such errors would typically be apparent in the decoded frame as one or more artefacts and/or missing portions of the frame. In the example shown in FIG. 2, frame 103 in the sequence of frames is erroneous and exhibits a partial loss 113 in the frame because not all of the data required to completely decode the frame was made available to the decoder 12 by the time frame 103 was due to be decoded.

As mentioned above, in some applications such as video conferencing, it may be preferable to maintain a real-time display rather than pause the display while data to correct the error or a new key frame is awaited. The decoder 12 is configured to decode as much of incomplete frame 103 as possible so that it can be displayed at the appropriate time without any delay. Thus the real-time rate of displaying (and potentially decoding) the sequence of frames is maintained. Frame 103 could be an I frame, or a P frame based on a preceding frame, e.g. frame 102.

Due to the incomplete frame 103, the first decoder 12 can be said to have lost synchronisation with the encoder as the decoded frame is different (due to the partial loss 113) to the frame that was encoded. This loss in synchronisation can cause errors in subsequent frames. In the example shown in FIG. 2, frame 104 is a P frame that is based on preceding frame 103. However, frame 103 has a partial loss 113 which will propagate into frame 104 because frame 104 is a P frame based on frame 103. The partial loss 114 would continue to propagate through subsequent frames 105-107 (as shown in the figure) until a new "key" frame is received whose ability to be decoded does not depend on prior frames. Thus frames 104 to 107 will also be decoded and displayed with partial losses 114 to 117.

The missing or corrupted data that leads to the error 113 in frame 103 may become available at a later time due to, for example, subsequent retransmission of the missing data itself or other data sufficient to permit recovery of the missing data for frame 103. However, at this later time, frame 103 would be likely to be out-of-date and unsuitable for decoding and display in a real-time video stream. In the example shown in FIG. 2, the data required to complete frame 103 arrives at the receiving device 10 at about the time that frame 105 is decoded by the decoder 12, and is too late for the frame 103 to be decoded by the decoder 12 and displayed without error. This delay between frame 103 being partially decoded for display in the real-time video stream and the time at which the missing data is received is indicated by arrow 125 in FIGS. 2 and 3.

Receiving device 10 further comprises a second decoder 13 and a controller 14 which can help recover synchronisation with the encoder. The controller 14 may be a separate entity to, and coupled to, the decoders 12 and 13. Alternatively, one or both decoders 12 and 13 may be configured to carry out some or all of the functionalities of the controller described herein.

The controller 14 is arranged to detect errors. The controller 14 can detect errors such as missing or corrupted data for a frame, the re-transmitted data (e.g. error correction data or late arriving data packets carrying missing frame data) and a decoder 12 or 13 flagging up an error while decoding. On arrival of error correction data, such as the missing data, the controller 14 initialises second decoder 13 and causes the decoder 13 to complete the decode of frame 103 so as to form complete frame 103a with error 113 being corrected 113a. Frame 103a is not displayed because the incomplete version of it decoded at the first decoder 12 has already been displayed. Decoder 13 then continues to decode incoming data so as to generate a stream of complete frames 104a-109a which do not include the errors, caused by error 113, propagating through the stream of frames generated by decoder 12. However, the frames for display are for the moment provided by the stream of incomplete frames from decoder 12, which runs concurrently with decoder 13.

Each decoder 12 and 13 maintains context data necessary for the decoding of an encoded video stream into a sequence of decoded frames. When decoding a video stream that makes use of intermediate and reference frames, between reference frames such context data would typically include the most recently decoded frame with respect to which the changes expressed in a subsequent intermediate frame are applied. The context data is saved into a separate region of memory in response to events such as errors in the decoder, or missing data for a frame.

On receiving the data missing from frame 103, the second decoder 13 is initialised with a saved context of decoder 12 that includes the information necessary for decoder 13 to decode frame 103a and continue the decode processing of the stream of frames from frame 103a. In the case frame 103/103a is a P frame, the context may for example include the previous complete frame, 102.

The context of decoder 12 could be replicated and saved in response a loss in the encoder-decoder synchronisation. The loss in encoder-decoder synchronisation may be caused by, for example, the decoder 12 being unable to perform a complete decode of a frame, due to, for example, missing one or more or all data packets for that frame, missing an I-frame that a P-frame to be decoded is dependent on, or any other reason that would cause a loss in synchronisation. Either the decoder 12 or controller 14 might be configured to cause the context data to be replicated and stored, suitably at a memory 15. The saved context data might be the context data associated with the last complete frame that was successfully decoded (e.g. frame 102 in FIG. 2). The saved context data could include the state of the decoder 12 at the time frame 102 was decoded, the received encoded data for frame 102, the decoded frame 102 and other suitable data that would allow continuation of the decoding process from frame 102 at an arbitrary later time. Alternatively, the saved context data might be context data associated with the frame which the decoder 12 was unable to fully decode (e.g. frame 103) such that the second decoder 13 can utilise some of the processing performed by decoder 12 in re-performing the decode of frame 103.

Context data could be maintained for the last complete frame that was successfully decoded by arranging that the context data associated with each complete frame that is successfully decoded is automatically saved. Again, either the decoder 12 or controller 14 might be configured to cause the context data to be stored, suitably at the memory 15.

It can be advantageous to arrange that the controller 14 itself determines that the decoder 12 is unable to perform a complete decode of a frame. This could be implemented by arranging the controller 14 to detect missing data in the video packet stream from the transmitting device as a result of, for example, packet loss during transmission over the network 17, late arrival of data packets, receiving corrupted data packets, or by any other suitable means. On detecting an error, the controller 14 is preferably configured to send a request to the transmitting device to retransmit the missing data—e.g. by requesting retransmission of data packets carrying the missing data.

In order to enable decoder 13 to catch up with decoder 12, second decoder 13 is configured to run at a faster rate than decoder 12, which need only maintain a decode rate sufficient to provide frames for display at real-time. In this way, the sequence of frames 103a to 107a generated by the second decoder 13 catches up with (i.e. converges on) the sequence of frames 103 to 107 generated by the first decoder 12. At some point, both decoders will be decoding the same frame. In the example shown in FIG. 2, this occurs when the generating of frame 107 by decoder 12 coincides with the generating of frame 107a by decoder 13. At this point, the rate that the frames are decoded at the second decoder 13 is decreased to match the rate at which the first decoder 12 is being operated.

Once decoder 13 has caught up with decoder 12, the stream of frames for display is switched from displaying the stream of frames from decoder 12 to displaying the stream of frames 108a, 109a from decoder 13. Thus, switching of the streams for display from the first decoder 12 to the second decoder 13 preferably occurs such that the next frame due to be displayed in the sequence of frames after the streams coincide is a frame from the second decoder 13. Preferably, the switching of the streams for display occurs such that the rate at which the frames are displayed (e.g. the real-time rate) can be maintained. For example, if decoder 13 starts decoding frame 107a at the same time as decoder 12 starts decoding frame 107, then frame 107a will have been decoded in time for it to be displayed and so the stream for display can be switched so that frame 107a is displayed instead of frame 107. On the other hand, if decoder 13 starts decoding frame 107a at a time after decoder 12 starts decoding, then it is likely that frame 107a may not be decoded in time for it to be displayed and so frame 107 is displayed and then the stream for display is switched to frame 108a onwards.

After the switch of the stream for display, decoder 12 is configured to stop decoding frames and may be deactivated or put into a standby mode, which allows the receiving device 10 to save on resources. At the point when the stream of frames from the second decoder 13 is displayed, encoder-decoder state synchronization is said to be achieved.

During the catch-up phase 126 the first and second decoders 12 and 13 are decoding frames at the same time, but at different rates. During the catch up phase 126, the erroneous stream of frames (103-107) decoded at the first decoder 12 is displayed and the speeded up stream of frames (103a-107a) decoded at the second decoder 13 is not displayed. Once the second decoder 13 has caught up with the first decoder 12, the controller 14 switches the stream of frames to be displayed from the stream of frames decoded at the first decoder 12 to the stream of frames decoded at the second decoder 13.

The faster rate of the second decoder 13 during the catch-up phase 126 can be varied depending upon available processing resources of the receiving device 10. The controller 14 can determine the processing resources available and set the decoding rate of the second decoder 13 accordingly. The decoding rate at the second decoder 13 may be proportional to the amount of processing resources available. Increasing the decoding rate of the second decoder 13 would shorten the catch up period 126. However, the amount that this rate is increased by may be limited by the amount of processing resources available. Thus there is a trade-off between additional CPU usage and the encoder-decoder resynchronization time.

The controller 14 can determine the total amount of processing resources available for decoding frames. The controller 14 can then determine the minimum amount of processing resources required to decode frames at decoder 12 at the real-time rate and subtract this minimum amount from the total amount to determine an amount of processing resources available for decoder 13. The faster decode rate can then be determined from the amount of processing resources available for decoder 13. The controller 14 can then set decoder 13 to decode at the determined rate. The faster decode rate of decoder 13 can be determined in dependence on, for example, available CPU and memory resources, the size of the frames, the frame rate at which the frames are to be displayed, etc. As described below, the catch-up time 126 is dependent on the relative decoding rates of the first and second decoders 12 and 13. Thus the catch-up time 126 can also be determined in dependence on the available resources.

Preferably, the faster rate at the second decoder 13 during the catch up period is between about two to about four times the "real-time" rate of the first decoder 12. The controller 14 can estimate the expected catch-up time 126 using the difference in the decoding rates at the decoders 12 and 13. Typically, a setting of two times the first decoder rate will deterministically bind the maximum decoder CPU usage to three times a single decoder CPU usage for the duration of the catch up phase 126.

Based on the frame decoding rates of the first and second decoders 12 and 13 and the amount of time between decoding frame 103 at the first decoder 12 and decoding frame 103a at the second decoder 13, the controller 14 can determine an approximate time when the streams of decoded frames from the first and second decoders 12 and 13 will coincide.

The catch up time 126 can be calculated using the following equation:

$$\text{Catchup time} = (TS_{current} - TS_{recovered}) \times \left( \frac{1}{\text{rate}} + \frac{1}{\text{rate}^2} + \frac{1}{\text{rate}^3} + \ldots \right) \quad (1)$$

Where $TS_{current}$ is the timestamp (in, e.g., micro-seconds) of the current frame decoded at the decoder 12 at the start of the catch up period (frame 105) or a time when the second decoder 13 decodes frame 103a, $TS_{recovered}$ is the timestamp (in, e.g., micro-seconds) of the old frame that was erroneous (frame 103) and the "rate" is the rate of the second decoder 13 relative to the first decoder, which can be calculated by dividing the decoding rate at the second decoder 13 by the decoding rate at the first decoder 12.

Equation 1 can be explained using the following example. Assume the difference in $TS_{current}$ and $TS_{recovered}$ is 1000 ms and the "rate" of the second decoder 13 is 2 times the speed of the first decoder 12. The amount of frames decoded at the first decoder 12 in 1000 ms will be decoded in 1000×½ (first term in equation)=500 ms at the second decoder 13. However, by this time the first decoder 12 would have advanced by 500 ms. So now the amount of frames decoded at the first decoder 12 in 500 ms will take the second decoder 13 500*½=250 ms=1000*¼ (second term in equation) to decode the same amount. Again 250 ms at 2× speed will take 125 ms=1000*⅛ (third term in equation), and 125 ms at 2× speed will take 62.5 ms=1000*1/16 (fourth term in equation) and so on. This represents a geometric progression.

Equation 1 in the form of a geometric progression is:

$$a + ar + ar^2 + ar^3 + ar^4 + \ldots = \sum_{k=0}^{\infty} ar^k = \frac{a}{1-r}, \quad (2)$$

for $|r| < 1$

Alternately, $$ar + ar^2 + ar^3 + ar^4 + \ldots = \sum_{k=0}^{\infty} ar^k - a = \frac{a}{1-r} - a = \frac{ar}{1-r}, \quad (3)$$

for $|r| < 1$ where $a = (TS_{current} - TS_{recovered})$, and $r = \frac{1}{\text{rate}}$ Substituting provides the following equation for determining the catch up time:

$$\text{Catchup time} = \frac{(TS_{current} - TS_{recovered})}{\text{rate} - 1} \quad (4)$$

The calculated catch up time is the amount of time required to the second decoder 13 to catch up with the first decoder 12. Thus the point in time when catch up is complete (hereinafter referred to as the "catch up completion time") is the time when the second decoder 13 beings decoding frame 103a in addition to the calculated catch up time. Using the calculated catch up completion time, the controller 14 can determine when to switch the stream of frames for display from the first decoder 12 to the second decoder 13. For example, the controller 14 can calculate the catch up completion time and switch the stream of frames from the first decoder 12 to the second decoder 13 so that the switched steam begins at the first frame decoded at the second decoder 13 after the catch up completion time.

During the catch-up phase 126, if the first decoder 12 receives data sufficient to correct loss of synchronization (e.g. an Instantaneous Decoder Refresh, IDR), the decoder-encoder synchronization is automatically regained and so the catch-up phase 126 is terminated and the second decoder 13 is deactivated.

In some scenarios, processor resources may be insufficient for catch-up within a reasonable time due to the effective decoding rate of the second decoder 13 being less than or approximately the same as that of the first decoder 12. Under such conditions, the controller 14 can be configured to terminate the second decoder 13 and, if it hasn't already done so, request resynchronisation of the decoder (e.g. request an IDR).

FIG. 3 illustrates a scenario where the second decoder 13 encounters a frame 105a comprising a second error 118 during the first catch up phase 126. As discussed above, context data for the second decoder 13 and associated with frame 104a is saved. This allows a third stream of frames (105b-112b) initialised using context data saved at frame 104a to begin at the first decoder 12. When the first catch up phase 126 has completed, the stream of frames displayed is switched by the controller 14 from the first stream (101-107) outputted from the first decoder 12 to the second stream outputted from the second decoder 13 from frame 108a.

Because of the second error 118 introduced at frame 105a, displayed frames 108a to 110a outputted by the second decoder 13 are incomplete and comprise second errors 121 to 123 respectively which have propagated through the stream from the respective errors in frames 105a to 107a. When the first catch up phase 126 is completed and decoder 13 is providing frames for display, the first decoder 12 can be used to generate a new stream of frames 105b-112b that are free from the errors introduced by error 118.

The second catch up phase 127 can begin at decoder 12 once the missing data causing error 118 has been received so that a complete frame 105b can be decoded with error 118 being corrected 118b. In an analogous fashion to the first catch-up phase 126, in the second catch-up phase 127 the first decoder 12 is operated at a faster rate than second decoder 13. The second catch up phase 127 is initialised using the second decoder context data saved at frame 104a. When the second catch up phase 127 ends at frame 110a/b, the decoding rate at the first decoder 12 is decreased to match that of decoder 13 and the controller 14 switches the frames to be displayed from the stream of frames 108a onwards generated at decoder 13 to the stream of frames 111b onwards generated at decoder 12. After the switch of the stream for display, decoder 13 can then cease decoding of any frames. At the end of the second catch-up phase 127, decoder 12 can be said to once again be in synchronization with the encoder.

Each of the first and second decoders 12 and 13 may comprise its own input and/or output buffers (not shown). Data for decoding into frames is directed to the active decoders by the controller 14. Typically only one decoder will be active until a frame cannot be completely decoded and a catch-up phase is entered where both decoders are active. For example, with reference to FIG. 2, the controller 14 causes frame data received at the communication port 11 relating to frames 101 to 107 to be sent to the input buffer of the first decoder 12 for decoding, but data relating to frames 103 to 107 to be sent to both decoders (12 and 13) during the catch-up phase 126.

The first and second decoders described herein may be separate decoder units, different decoder pipelines of a single decoder unit, or a single decoder unit arranged to concurrently support the first and second decoders. Each of the first and second decoders can have their own input/output buffers, as described in the paragraph above. In the case that the first and second decoders are supported at a single decoder unit, the separate decode streams of the first and second decoders could be concurrently supported in any suitable manner. For example, such a decoder unit could be configured to alternate between running the first decoder and running the second decoder at a common decoder pipeline, perhaps by alternately allocating slices of processing time to each of the first and second decoders. Thus, in the case that the first and second decoders are supported at a single decoder unit: (i) a first input buffer, the decoder unit and a first output buffer could operate as the first decoder; and (ii) a second input buffer, the same decoder unit and a second output buffer could operate as the second decoder 13. The behaviour of first and second decoders supported at a single decoder unit can be controlled through the use of appropriate buffer synchronous commands.

In the examples described herein, two decoders are provided. However, it will be appreciated that the decoding and synchronising method described herein can be readily extended to receiver devices having more than two decoders.

Figure 4:
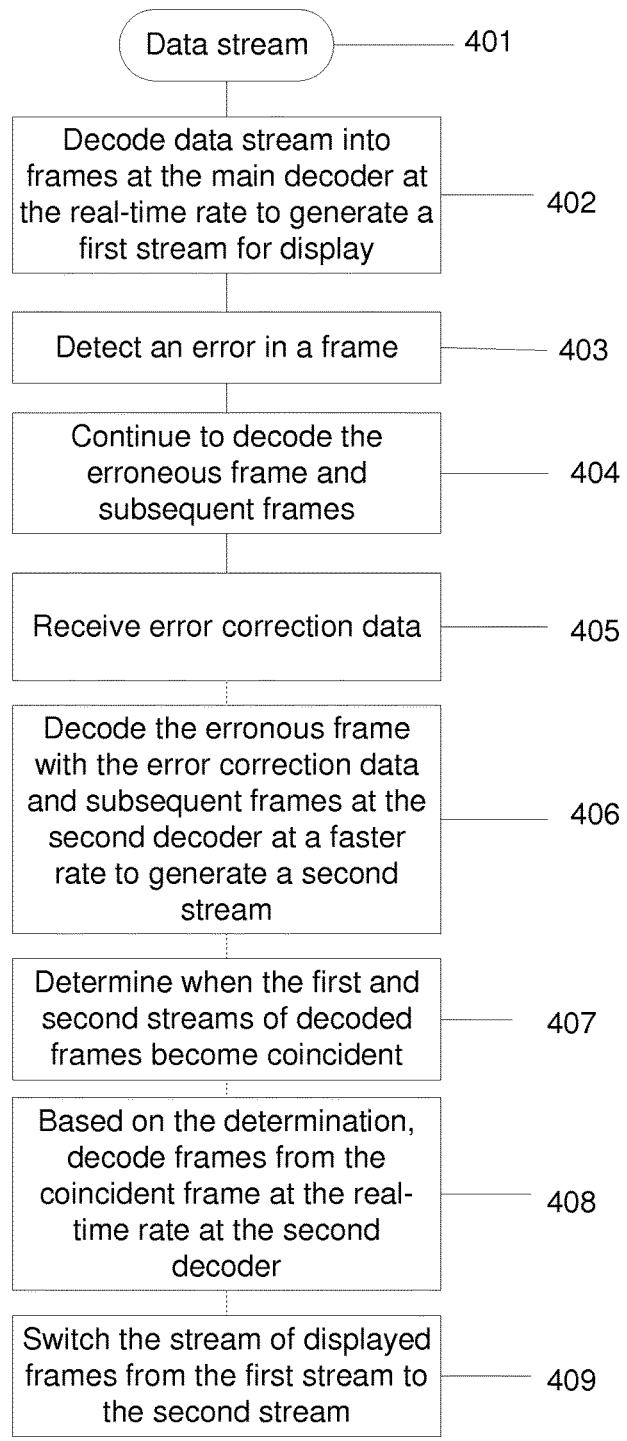
FIG. 4 is a flowchart of a method of decoding a sequence of frames.

An exemplary method for decoding a video data stream 401 is outlined in the flowchart of FIG. 4.

At step 402, the data stream is decoded into a sequence of frames at the first decoder 12 at a real-time rate. The first decoder 12 generates a first stream of decoded frames, which are to be displayed.

At step 403, an error is detected by the first decoder 12. The error could be, for example, missing or corrupted data that will cause a frame to be partially or wholly incomplete.

At step 404, the first decoder 12 continues to decode the erroneous frame and the frames subsequent to the erroneous frame so that they can be displayed. By allowing the first decoder 12 to continue decoding erroneous frames, the video can continue to be displayed without being halted or frozen while the error is being corrected.

At step 405, the missing data that allows the complete frame to be recovered is received.

At step 406, the second decoder 13 decodes the frame using the missing data and frames subsequent to that frame are also decoded at the second decoder 13 to generate a second stream of decoded frames. The frames are decoded at the second decoder 13 at a rate that is greater than the decode rate of the first decoder 12 such that the stream of frames at the second decoder 13 converges with the stream of frames being decoded at the first decoder 12.

At step 407, it is determined when the first and second streams of decoded frames become coincident. The streams become coincident when the first and second decoders decode the same frame in the sequence of frames at approximately the same time.

At step 408, based on the determination, the decoding rate of the second decoder 13 is reduced to the real-time rate from the frame at which the first and second streams coincide. At step 409, the stream of decoded frames for display is switched from the first stream to the second stream from the second decoder 13. The displayed frames from the second stream do not contain the error as the sequence of frames decoded at the second decoder 13 began with the corrected frame. The state of the decoder used at the receiving device 10 has thus been resynchronised with the encoder without halting or pausing the display.

Figure 5:
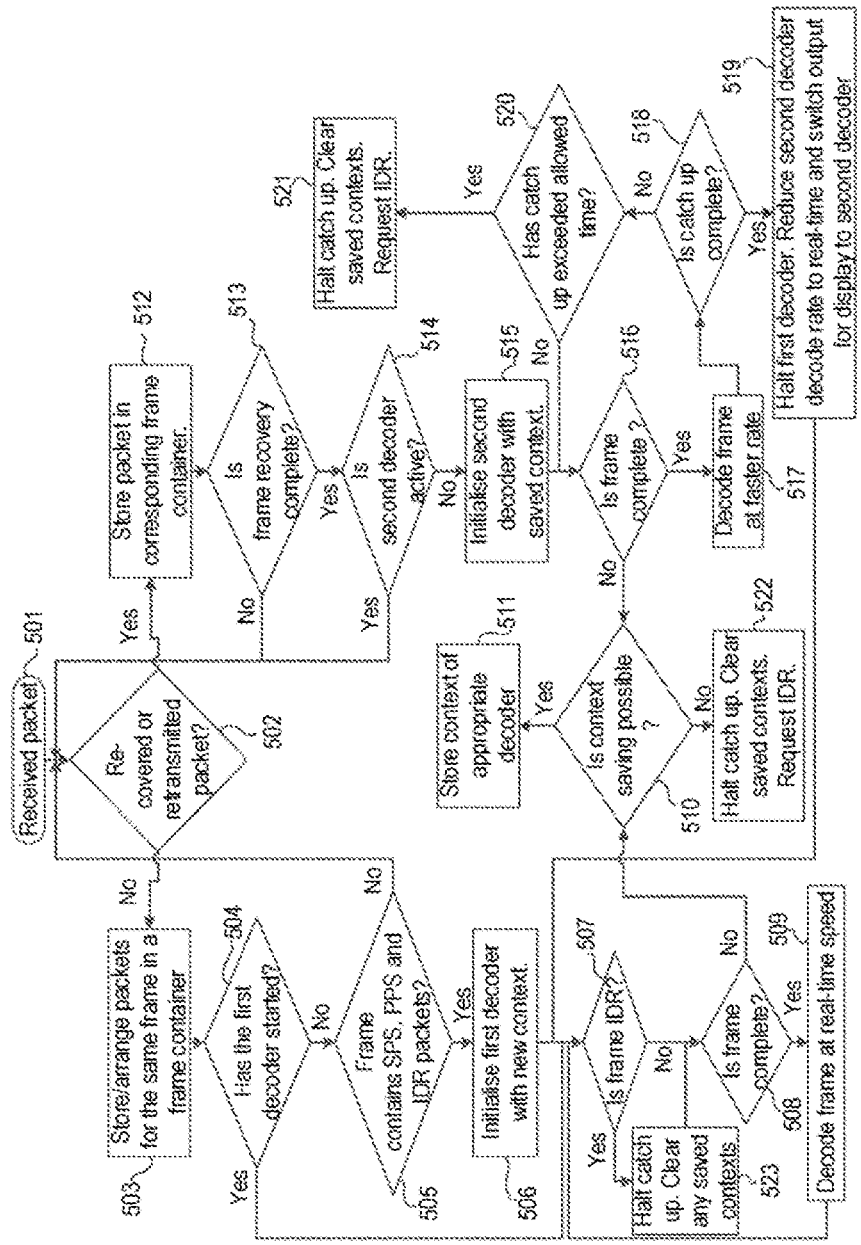
FIG. 5 is a flowchart illustrating the processing of packets.

FIG. 5 depicts an exemplary method for processing packets 501 received as part of the data stream received at the receiving device 10.

At step 502, the frame that the packets belongs to is identified. The packets may have a timestamp which identifies the frame that the packets are for. If the packet is a recovered or retransmitted packet, then the process moves on to step 512. Otherwise the process moves on to step 503.

At step 503, the packets are stored and arranged according to the frame that the packet belongs to. The packets for the same frame can be stored and arranged in a corresponding frame container.

At step 504, it is determined whether the first decoder 12 has been initialised and started to decode frames. If the decoder 12 has not been initialised then the process moves on to step 505. If the decoder has been initialised and is therefore ready to decode frames, then the process moves on to step 507.

At step 505, if a frame container for a frame comprises the information necessary to initialise the decoder in order to decode a sequence of frames (e.g. Sequence Parameter Set (SPS), Picture Parameter Set (PPS) and IDR) then the decoder 12 is initialised using that information at step 506. If the frame container does not comprise that information, then the process loops back until that information is received. When the decoder 12 has initialised, the next frame container is checked at step 507. If that next frame is not an IDR frame or I-frame, the process moves on to step 508.

At step 508, if all of the packets for the frame have been received to complete the frame then the process moves on to step 509 where the frame is decoded at the real-time rate and is outputted from the decoder 12 so that it can be displayed. The process then loops back to step 507 for the next frame in the sequence of frames.

If, at step 508, not all of the packets for a complete frame have been received, then the process moves on to step 510. At step 510, it is determined if there are resources available for another decoder context to be saved. In this example, an active first or second decoder 12 or 13 can each save only one decoder context. For example, referring to FIG. 3, the first decoder 12 initially operates with a first context associated with frame 101. Then, a second context associated with frame 102 is saved due to the error 113 in frame 103. The second context is used to initialise the second decoder 13. The first decoder 12 does not save another context in response to second error 118 in frame 105 as the first decoder has already saved the second context which is being used by the second decoder 13. Instead, the second decoder 13 saves a third context associated with frame 104a in response to the second error 118 in frame 105a. If another error was encountered after saving the third context (e.g.

another error in frame 106*a*) then another context cannot be saved as the second decoder 13 has already saved the third context and so an IDR is requested.

Preferably, the number of decoder contexts that can be saved and utilised at a point in time is limited to N+1 contexts for N decoders so as to save on resources. If there are adequate resources, then the context of the first decoder 12 is saved at step 511. Preferably, when more than one decoder is active, only the last decoder in the catch up hierarchy is allowed to save a context, if it has not already done so. All other decoders will continue decoding when encountering more errors. Preferably, the faster decoding rate distribution between N−1 number of decoders increases exponentially (E.g. a first decoder: real-time rate; second decoder: 2× real-time; third decoder: 4× real-time; fourth decoder: 8× real-time; fifth decoder: 16× real-time . . . ) up to a maximum rate (e.g. 32× real-time). Preferably, the distribution of the maximum available rate for the N−1 catch up decoders (i.e. the decoders decoding at a rate faster than the real-time rate) is determined using the following formula:

$$r^1 + r^2 + \ldots + r^{(N-1)} = \text{maximum available rate}$$

where r is 1/rate as mentioned above. The r value may be used in updating the expected catch up time in catch up time formulas above in response to a change in the number of active decoders. The maximum available rate can be dependent on available resources as discussed above.

When missing packets are received, they are stored in their corresponding frame container at step 512. At step 513, it is determined if all of the packets have been received to complete the frame, and if so, the process moves on to step 514. At step 514, it is determined if the second decoder 13 is active, and if not, it is activated at step 515. At step 515, the second decoder 13 is initialised with the context of the first decoder 12 saved at step 511.

Using the packets initially stored at step 503 in the frame container and the retransmitted/recovered packets stored at step 512 in the same frame container, the second decoder 13 decodes the complete frame at step 517. At step 517, the completed frame is decoded at a rate that is faster than the real-time rate. The second decoder 13 then decodes any subsequent frames that have been stored at the faster rate until it catches up with first decoder 12. Once catch up has been completed (step 519), the first decoder 12 ceases decoding frames and the second decoder 13 decodes frames at the real-time rate, which are then outputted for display instead of the frames from the first decoder 12. The process at the second decoder 13 then continues for subsequently received frames from step 507. If, during the catch up period, the second decoder 13 encounters an incomplete frame (step 516), it is determined if another context can be saved (step 510) and a second catch up can begin as described in relation to FIG. 3. If it is determined that adequate resources are not available for another context to be saved, then the catch up is halted at step 522, the saved context is cleared and an IDR is requested.

At step 520, if the catch up period exceeds a predetermined amount of time (for example, due to a slowdown in the decode rate due to a lack of resources), the catch up is halted, the saved context is cleared and an IDR is requested (step 521).

If an IDR frame or I-frame is received at any time (step 507), then any catch up is halted and any saved contexts are cleared (step 523). If an incomplete I-frame is received, a new context is saved based on the incomplete I-frame. Any subsequent P-frames will be based on the incomplete I-frame and thus will be erroneous as the encoder and decoder are not synchronised. However, this will still allow the P-frames to be displayed to maintain the real-time display. Encoder-decoder synchronisation can then be regained using the catch up method described herein when the missing packets for completing the I-frame are received. The completed I-frame will then be saved as part of new context data which is used for catch up at the second decoder 13.

At step 507, a complete loss of an I-frame can also be detected. Frame numbers become reset after each I-frame and then increase for each subsequent dependent P-frame. If, at step 507, a P-frame number is less than the previously received P-frame then this can indicate that there should have been an I-frame received in between those P-frames. Therefore, a loss of an I-frame is detected and an IDR can be requested.

The examples described herein have many advantages over previous methods for dealing with errors in video streams. By providing a plurality of decoders and a capability to switch the decoded frames to be displayed between the plurality of decoders, a stream of video frames for display can smoothly transition from incomplete frames being output from one decoder to complete, error-free frames decoded at another decoder. Thus the stream of frames need not be halted whilst it is attempted to complete the frame, which can cause jerky, slow/fast, non-real-time playback and frame freezes. Furthermore, this arrangement reduces the need for requesting IDRs due to packet losses by relying on re-transmitted packets or error correction data which may arrive later than their playback time.

The examples described herein further allow a receiving device to display frames at the minimum possible latency, without having to allow for frames to be completed in the event of an error. A reduction in end-to-end latency typically reduces the buffering requirements, which can be important for the user experience during a video conferencing/telephony. Unlike methods that require both encoder and decoder support, such as RPS and FEC, the methods described herein need only be implemented at a decoder (i.e. only at the receiver side).

Data processing systems configured in accordance with the examples described herein could be embodied in hardware, software or any suitable combination of hardware and software. A data processing system of the examples described herein could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing system, and/or heterogeneous processors comprising one or more dedicated, programmable and general purpose processing functionalities. In the examples described herein, data processing systems comprise one or more processors and one or more memories having program code stored thereon, the data processors and the memories being such as to, in combination, provide the claimed data processing systems and/or perform the claimed methods.

Data processing units described herein (e.g. decoders 12 and 13 and controller 14) need not be provided as discrete units and represent functionalities that could (a) be combined in any manner, and (b) themselves comprise one or more data processing entities. Data processing units could be provided by any suitable hardware or software functionalities, or combinations of hardware and software functionalities.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the data processing methods described herein could be performed by one or more physical processing units executing program code that causes the unit(s) to perform the data processing methods. Each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A data processing system for decoding a data stream, the data processing system comprising:
a first decoder configured to decode the data stream into a first sequence of media frames at a first decode rate so as to generate a first media stream for playback in real-time;
a second decoder operable to decode the data stream into a second sequence of media frames at a second decode rate so as to generate a second media stream; and
a controller configured to detect an error in decoding a particular frame of the first sequence and, responsive to that detection, cause the second decoder to decode the data stream from the particular frame in the sequence of media frames,
the second decoder being arranged to decode from the particular frame in dependence on error correction data received over the data stream for the particular frame,
wherein the second decode rate is faster than the first decode rate such that the second sequence of frames of the second media stream catches up with the first sequence of frames of the first media stream,
the controller being further configured to:
determine when the second sequence of frames from the second decoder catches up with the first sequence of frames from the first decoder by determining a time difference between a time when the particular frame is decoded at the first decoder and a time when the particular frame is decoded at the second decoder, and dividing the time difference by a relative rate subtracted by 1, the relative rate being the second decode rate divided by the first decode rate; and
responsive to that determination: (i) cause the second decoder to operate at the first decode rate so as to generate the second media stream for playback in real-time, and (ii) switch the stream for playback from the first decoder to the second decoder.

2. A data processing system as claimed in claim 1, the controller being further configured to cause the first decoder to cease decoding the media data stream responsive to its determination as to when the sequence of frames from the second decoder catches up with the sequence of frames from the first decoder.

3. A data processing system as claimed in claim 1, wherein the controller is configured to determine when the sequence of frames from the second decoder catches up with the sequence of frames from the first decoder by estimating from the first and second decode rates when the first and second decoders will decode the same frame.

4. A data processing system as claimed in claim 1, the controller being configured to determine the second decode rate from the processing resources available at the data processing system for the second decoder.

5. A data processing system as claimed in claim 1, wherein the controller is configured to, responsive to the error detection, initialise the second decoder using context data from the first decoder.

6. A data processing system as claimed in claim 5, wherein the context data includes one or more of the last complete frames of the first media stream, state information of the first decoder up to the point at which the last complete frame was decoded, the first frame as generated by the first decoder, and state information of the first decoder from the point at which the error was encountered.

7. A data processing system as claimed in claim 1, wherein the error encountered by the first decoder is data missing from the data stream, or corrupted data of the data stream, or an encoder error.

8. A data processing system as claimed in claim 1, the second decode rate being between two and four times greater than the first rate.

9. A data processing system as claimed in claim 1, the second decode rate being about two times greater than the first rate.

10. A data processing system as claimed in claim 1, the first decoder being configured to decode said particular frame so as to generate a frame with artefacts for playback.

11. A data processing system as claimed in claim 1, the first decoder being configured to, on continuing to generate the first media stream for playback after encountering the error decoding the particular frame, decode frames subsequent to the particular frame so as to generate frames for playback which potentially include artifacts.

12. A data processing system as claimed in claim 1, further comprising a communications port for receiving the data stream.

13. A method of decoding a data stream, the method comprising:
at a first decoder, decoding the data stream into a first sequence of media frames at a first decode rate so as to generate a first media stream for playback in real-time;
detecting an error in decoding a particular frame of the first sequence and, responsive to that detection, causing a second decoder to decode the data stream from the particular frame in the sequence of media frames;
at the second decoder, decoding the data stream into a second sequence of media frames at a second decode rate so as to generate a second media stream, the second decoder decoding from the particular frame in dependence on error correction data received over the data stream for the particular frame, wherein the second decode rate is faster than the first decode rate such that the second sequence of frames of the second media stream catches up with the first sequence of frames of the first media stream;

determining when the second sequence of frames from the second decoder catches up with the first sequence of frames from the first decoder by determining a time difference between a time when the particular frame is decoded at the first decoder and a time when the particular frame is decoded at the second decoder, and dividing the time difference by a relative rate subtracted by 1, the relative rate being the second decode rate divided by the first decode rate; and responsive to that determination: (i) causing the second decoder to operate at the first decode rate so as to generate the second media stream for playback in real-time; and (ii) switching the stream for playback from the first decoder to the second decoder.

14. A non-transitory computer readable storage medium having encoded thereon computer-executable code that when executed causes at least one processor to:

decode a data stream into a first sequence of media frames at a first decode rate so as to generate a first media stream for playback in real-time;

decode the data stream into a second sequence of media frames at a second decode rate so as to generate a second media stream;

detect an error in decoding a particular frame of the first sequence and, responsive to that detection, cause decoding of the data stream from the particular frame into said second sequence in dependence on error correction data received over the data stream for the particular frame, wherein the second sequence decode rate is faster than the first sequence decode rate such that the second sequence of frames of the second media stream catches up with the first sequence of frames of the first media stream, determine when the second sequence of decoded media frames catches up with the first sequence of decoded media frames by determining a time difference between a time when the particular frame is decoded at the first decoder and a time when the particular frame is decoded at the second decoder, and dividing the time difference by a relative rate subtracted by 1, the relative rate being the second decode rate divided by the first decode rate; and responsive to that determination, cause the second media stream to be used for playback in real-time.

\* \* \* \* \*